United States Patent
Grossman et al.

(10) Patent No.: US 9,613,376 B2
(45) Date of Patent: Apr. 4, 2017

(54) APPARATUS AND METHOD FOR RECIPIENT DISTRIBUTION AND TRACKING

(71) Applicant: Bank of America Corporation, Charlotte, NC (US)

(72) Inventors: Glenn M. Grossman, Matthews, NC (US); Kevin Perry, Charlotte, NC (US); Kimberly B. Summerrow, Charlotte, NC (US); Katherine Dintenfass, Charlotte, NC (US); Elizabeth Votaw, Potomac, MD (US); Aaron R. Leinker, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 727 days.

(21) Appl. No.: 13/951,147

(22) Filed: Jul. 25, 2013

(65) Prior Publication Data

US 2015/0032585 A1   Jan. 29, 2015

(51) Int. Cl.
G06Q 40/00 (2012.01)
G06Q 50/18 (2012.01)

(52) U.S. Cl.
CPC ........... *G06Q 40/00* (2013.01); *G06Q 50/186* (2013.01)

(58) Field of Classification Search
CPC .................................................... G06Q 40/00
See application file for complete search history.

(56) References Cited

U.S. PATENT DOCUMENTS

| | | | |
|---|---|---|---|
| 5,241,466 A * | 8/1993 | Perry | G06F 19/322 705/1.1 |
| 6,246,991 B1 * | 6/2001 | Abe | G06Q 10/10 380/59 |
| 7,454,379 B1 | 11/2008 | Wolzenski et al. | |
| 7,716,732 B2 * | 5/2010 | Dodson | G06F 17/30011 707/715 |
| 7,860,805 B2 * | 12/2010 | Wood | G06Q 40/08 705/325 |
| 7,945,458 B1 | 5/2011 | Jackson | |
| 8,204,834 B2 | 6/2012 | Racanelli et al. | |
| 8,275,652 B2 * | 9/2012 | Hafeman | G06F 21/6245 705/35 |
| 8,296,298 B1 | 10/2012 | Redman | |
| 8,311,951 B2 * | 11/2012 | Wood | G06Q 40/08 705/1.1 |
| 8,321,318 B2 | 11/2012 | Armand et al. | |
| 8,335,702 B2 | 12/2012 | Kirsh et al. | |

(Continued)

FOREIGN PATENT DOCUMENTS

EP   2355029   10/2011

*Primary Examiner* — Nicholas Kiswanto
(74) *Attorney, Agent, or Firm* — Banner & Witcoff, Ltd.; Michael A. Springs

(57) ABSTRACT

An apparatus and method of maintaining beneficiary information are disclosed. The apparatus can be configured to perform the method, which may include obtaining information for one or more recipients of one or more conveyances of property, obtaining one or more digital IDs from the one or more recipients, maintaining the one or more digital IDs from the one or more recipients by periodically sending notifications to the one or more recipients, and distributing assets with the one or more digital IDs to the one or more recipients.

18 Claims, 3 Drawing Sheets

(56) References Cited

U.S. PATENT DOCUMENTS

| | | | |
|---|---|---|---|
| 8,510,187 B1* | 8/2013 | Dinamani | G06Q 40/10 705/31 |
| 8,639,635 B2* | 1/2014 | Wood | G06Q 40/08 705/325 |
| 8,725,537 B2* | 5/2014 | Lorsch | G06F 19/322 705/2 |
| 2002/0019744 A1* | 2/2002 | Yamamoto | G06Q 10/10 705/312 |
| 2002/0111946 A1 | 8/2002 | Fallon | |
| 2003/0018498 A1* | 1/2003 | Banks | G06Q 40/00 705/4 |
| 2005/0149425 A1 | 7/2005 | Hagan | |
| 2006/0168143 A1* | 7/2006 | Moetteli | G06Q 10/10 709/219 |
| 2007/0094125 A1 | 4/2007 | Izyayev | |
| 2009/0204528 A1* | 8/2009 | Moses | G06Q 40/00 705/35 |
| 2010/0057633 A1 | 3/2010 | Zafar et al. | |
| 2012/0284201 A1 | 11/2012 | Racanelli et al. | |
| 2013/0035965 A1 | 2/2013 | Wood | |
| 2013/0054455 A1 | 2/2013 | Hanson et al. | |

\* cited by examiner

APPARATUS AND METHOD FOR RECIPIENT DISTRIBUTION AND TRACKING

FIELD

The disclosure herein relates generally to a method and apparatus for the distribution of property to recipients such as beneficiaries of an estate, will, or trust and the tracking of the recipients.

BACKGROUND OF THE INVENTION

Currently, when property is distributed, for example, from a will or a trust, beneficiaries must receive a title to the property, check, money order, or electronic transfer consisting of the funds being transferred. This process can sometimes be difficult because often times the conveyance vehicle is prepared many years in advance of the property being ultimately distributed. For example, during this time, the beneficiary may move and/or the beneficiary's contact information may change, which may in certain instances cause complications in distributing the assets to the beneficiaries. For example, this may result in difficulties for a trustee or executor in locating the recipient of the assets of the particular conveyance. Additionally, the recipient may not desire to divulge the financial information required in order to obtain the funds, such as bank account information.

BRIEF SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

One exemplary embodiment may include an apparatus having a processor and a memory for storing computer readable instructions that when executed by the processor cause the computer to perform the steps of: obtaining information for one or more recipients of one or more conveyances of property, obtaining one or more digital IDs from the one or more recipients, maintaining the one or more digital IDs from the one or more recipients by periodically sending notifications to the one or more recipients, and distributing assets with the one or more digital IDs to the one or more recipients.

Another exemplary embodiment may include a method of maintaining beneficiary information. The method may include obtaining information for one or more recipients of one or more conveyances of property, obtaining one or more digital IDs from the one or more recipients, maintaining the one or more digital IDs from the one or more recipients by periodically sending notifications to the one or more recipients, and distributing assets with the one or more digital IDs to the one or more recipients.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
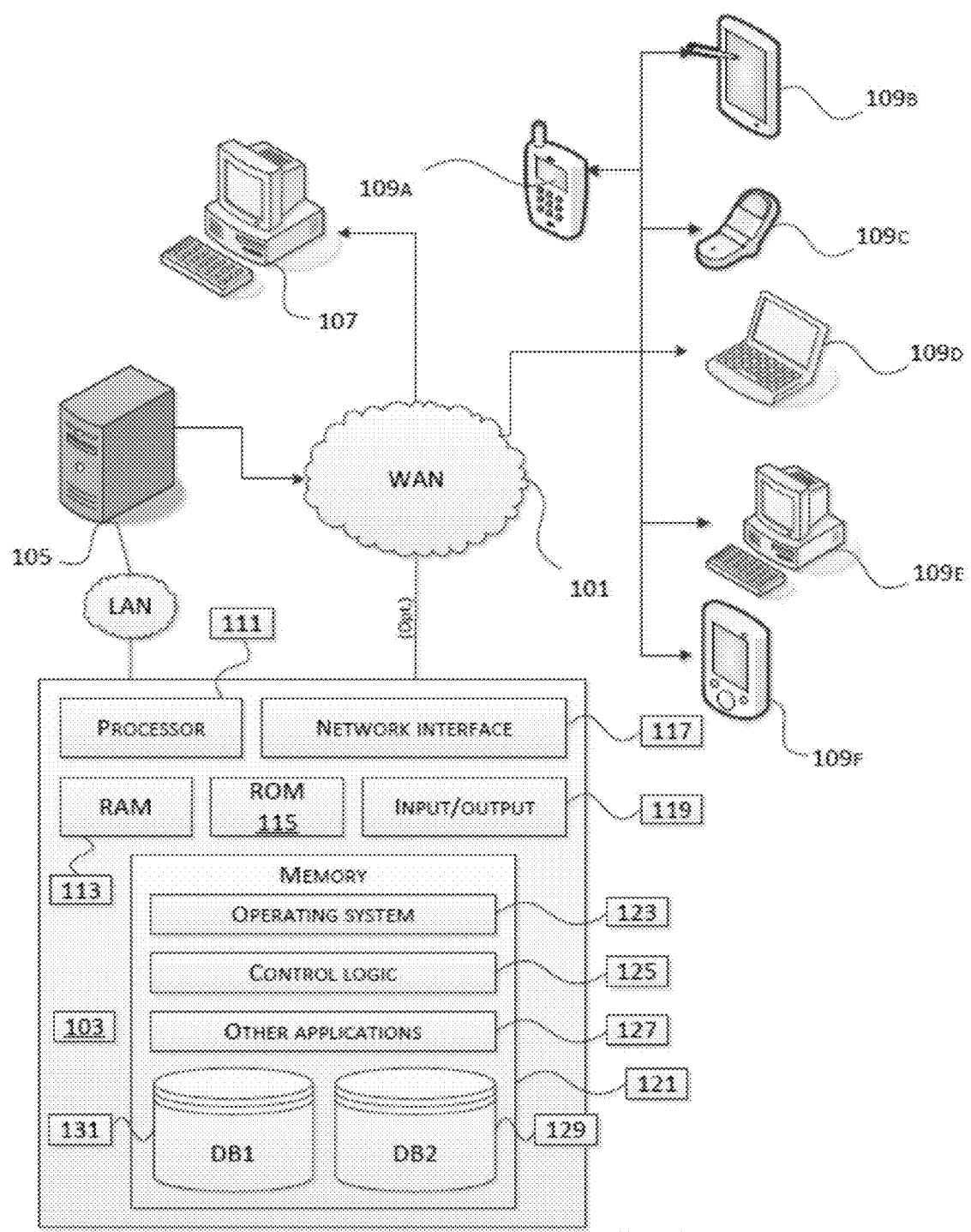
FIG. 1 illustrates one example of a network architecture and data processing device that may be used to implement one or more illustrative aspects of the invention.

FIG. 1 illustrates one example of a network architecture and data processing device that may be used to implement one or more illustrative aspects of the invention. Various network nodes 103, 105, 107, and 109A-F may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109A-F and other devices (not shown) may be connected to one or more of the networks via twisted pair wires, coaxial cable, fiber optics, radio waves or other communication media. For example, the above connections can be made via the internet, blue tooth, WiFi, infrared, or any other known method of wireless transmission.

As shown in FIG. 1, devices 109A-F may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other cash handling devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices 109A-F. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices 109A-F, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices 109A-F a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, or the like), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects of the invention, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109A-F) as described herein may be spread across multiple data processing devices, for example, to distribute processing load across multiple computers, to segregate transactions based on geographic location, user access level, quality of service (QoS), or the like.

One or more aspects of the invention may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

The examples provided herein relate to providing property conveyance vehicles such as trusts, wills, and estates, with a solution for obtaining and maintaining aliases or digital IDs for recipients of the property conveyance vehicles, such as beneficiaries or executors of trusts, wills, and estates. Once the property conveyance vehicle is implemented, the system can be configured to request and obtain recipient information. The system can provide a method to invite the recipients to enter digital ID data. This digital ID, e.g., phone number, email address, can be used to maintain contact with the recipient for providing notifications regarding the conveyance vehicle and can also be used to distribute monies and other assets from the trust or estate by using, for example, peer-to-peer payments. The system can periodically send notifications to the recipient to obtain confirmation from the recipient that the digital ID is still correct. In this way, contact with the recipient can be maintained during the life of the conveyance vehicle. This provides the ability for the administrator of the conveyance vehicle to stay in contact with all of the recipients.

In one example, after the conveyance vehicle, such as a will, trust, or estate has been established, a recipient can be notified that he or she is a beneficiary of the conveyance vehicle. The recipient can be contacted via email, text, or any other form of electronic communication. The recipient can then register in the system by providing a form of a digital ID or an alias. The digital ID could be in the form of an email address, cell phone number, social network ID, or the like. This can provide the ability to draw the information from an alias or digital ID database to distribute property by the administrator. In one example, money or funds can be distributed using a peer-to-peer system using the digital ID.

Figure 2:
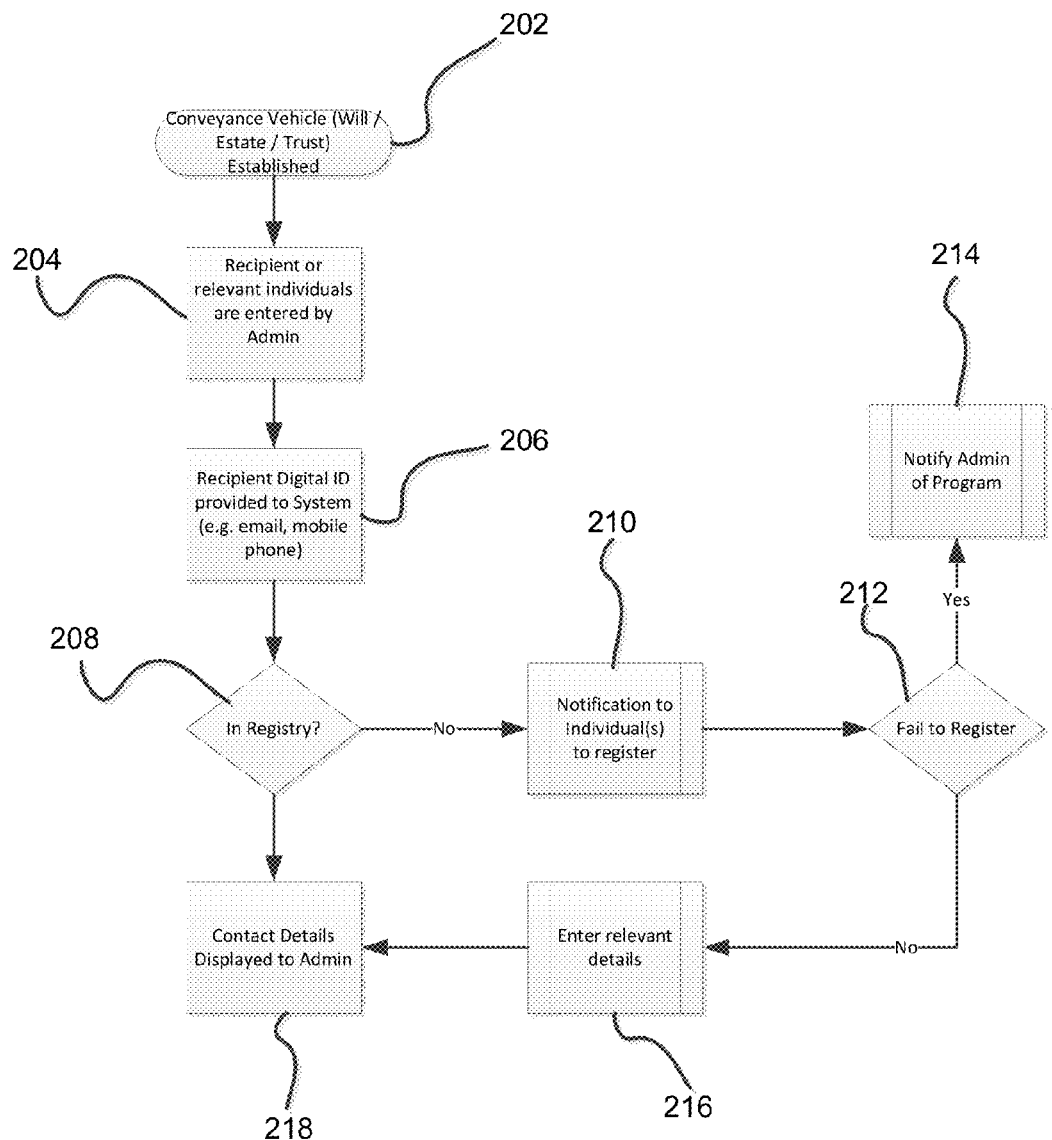
FIG. 2 illustrates an exemplary process of obtaining beneficiary information.

An exemplary process is shown in relation to FIG. 2 where beneficiaries, recipients, and other relevant individuals' information can be entered into the system. In the first step 202, a will, estate, or trust can be established. The conveyance vehicle, such as a will, estate, or trust, can be established by any known method and any relevant information regarding the will, estate, or trust can be provided and stored by the system. The conveyance vehicle can include any type of property (real, personal, tangible or intangible) and may include certain legal rights, interests and entitlements to property of any kind.

Once the conveyance vehicle is established, an administrator can add recipient and relevant individual information into the system at step 204. The system then can obtain information for one or more recipients of one or more conveyances of property and obtain one or more digital IDs or other alias from the one or more recipients in step 206. The digital IDs may include email addresses, mobile phone numbers, or social media IDs. The one or more recipients can be periodically notified to determine whether the one or more digital IDs have been altered. Alternatively, the recipient and relevant individual information can be automatically populated and stored into the system. As illustrated by step 208, the system can determine whether this information was provided when the conveyance vehicle was established.

As shown by step 210 if the information was not previously provided or found in the registry, a notification, via email, text, or any other form of electronic communication, can be sent to the recipients and/or other relevant individuals. After a predetermined amount of time, the system can notify an administrator that a particular individual has not registered. Alternatively, the system can wait for a predetermined amount of time and send additional notifications to the recipients and/or other relevant individuals as in step 210 and then after a certain predetermined number of attempts can notify an administrator that the individual has not yet registered. Once the individual is registered by the system contacting the individual or the administrator obtaining the information directly from the individual this information can be entered into the system at step 216, and the digital information can be provided or displayed to the administrator.

Additionally, data integrity checks can occur periodically to determine whether the alias information is still valid. This provides the ability to maintain accurate records of digital IDs by periodically confirming the digital IDs with the recipients during the life of the conveyance vehicle and maintains the one or more digital IDs from the one or more recipients by periodically sending notifications to the one or more recipients.

In another example, the data integrity check can include sending a reminder notification to the one or more recipients to log with the recipients' digital ID to review the status of the beneficiaries will, estate or trust. The system can be configured to send communications to the recipients to log in to check their benefits to generate usage of the system. This may also add value to the user in preventing consumers from forgetting about their accounts and helps prevent escheatment.

The system can also be configured to periodically check email, cell phone, or address information of individuals or recipients. Because the system maintains digital IDs, the system can also inform the individuals of the disbursement of property such as physical goods or monetary funds in the trust or the estate. Therefore, the system can be configured to distribute non-will, physical goods, or gifts of funds.

In addition, the conveyor can also provide a digital ID to the system and can be given the option of funding an account that is sponsored by an entity holding the funds for disbursement. In the case of a conveyance of funds, this network could be used to transfer funds to the recipient.

In one example, the system could periodically send notifications via the digital IDs, e.g. email or text messaging, and track whether responses have been received from the recipient or individual acting on behalf of the recipient. The responses could either confirm that the digital ID is still accurate or provide an updated digital ID and other relevant information. In one example, if a response is not received after a predetermined number of times, an automated notification can be sent to an administrator. The administrator can then investigate and conduct further follow up with the beneficiary as needed. The digital IDs can also be used to send additional notifications to the beneficiary such as changes to a conveyance vehicle including, for example, the addition of beneficiaries, the removal of beneficiaries, disbursement schedules, and the like.

Figure 3:
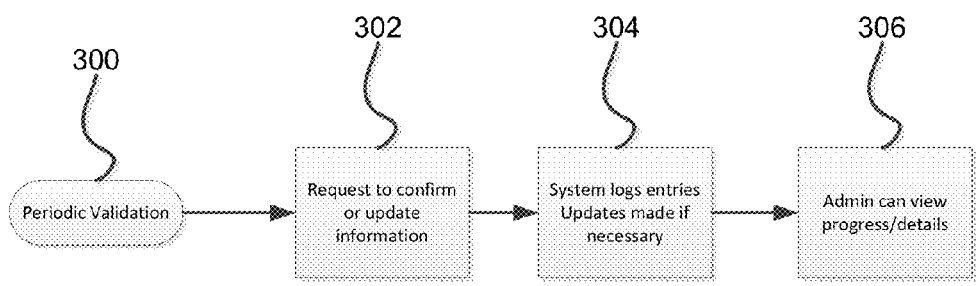
FIG. 3 illustrates an exemplary process of maintaining updated beneficiary information.

An exemplary schematic of the validation process is described in relation to FIG. 3. FIG. 3 illustrates a periodic validation process 300 where the digital IDs are periodically updated and/or maintained by conducting periodic checks on the named beneficiaries and recipients. In this process, as shown by step 302 beneficiaries or other relevant individuals can be contacted and/or notified to confirm or update contact information.

For example, a notification can be sent to one or more recipients of a conveyance vehicle requesting that the one or more recipients confirm that the digital ID is accurate. The notifications can include an automated letter, email, text, or any other type of electronic communication. The notifications can include requests to confirm the individual's digital ID and can include instructions on how to update an individual's digital ID. At step 304, the system can determine whether a confirmation of the individuals digital ID has been received and/or receive at least one updated digital ID from the one or more recipients of a conveyance vehicle and can log any updates that are made to the system as needed. Once the digital ID is updated, the system can then utilize the new digital ID for contacting the beneficiary or recipient. As illustrated by step 306, the administrator can view the progress of the updating process and can view details of the updating process. This permits the administrator the ability to intervene with the confirmation and updating process at any time.

Additionally, the system can track the responses from the beneficiaries and determine whether a response has been received. For example, the system can track the messages sent to beneficiaries and can determine whether the beneficiaries have provided any response or updated information. If no response or updated information is received from the recipient, the system can also send automated reminder notices to the recipient or individual acting on behalf of the recipient. The system can also generate automated notices for the administrator of recipients that have not responded so that the administrator can determine whether additional follow up is needed. In cases where the individual is not 18 years old, a designated guardian or other individual can be granted a form of guardianship. When the person turns the appropriate age, the guardianship can be transferred to the individual and the system could request that the alias or digital ID be updated at this time. The system can be configured to determine when the individual turns the appropriate age to obtain an updated digital ID at the appropriate time.

This system could be applied to all forms of property including money, stock, bonds, real estate, vehicles, or the like. When the property being transferred requires the transfer of a title, the system could provide notices to the recipient regarding the property to be transferred. The beneficiary could then acknowledge and arrange for the receipt of the property or the receipt of the title to the property.

Figure 4:
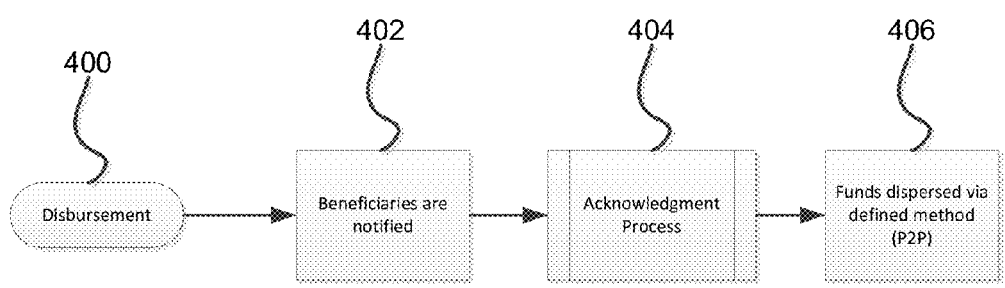
FIG. 4 illustrates an exemplary process of distributing assets to a beneficiary.

The schematic illustrated in FIG. 4 shows an example of how a disbursement 400 can be made to recipients of the conveyance vehicle. As shown in FIG. 4, a notification at step 402 can be sent to the beneficiaries that property is to be disbursed to the beneficiaries through the digital ID. This can be in the form of a distribution notification to the one or more recipients using the one or more digital IDs.

As illustrated by step 404, the recipient can be required to acknowledge a notification that the disbursement is to take place. In alternative embodiments, however, the system may not require the acknowledgement process to take place before the distribution of property. The one or more digital IDs can also be displayed to an administrator for the distribution of property.

The property can then be conveyed via a defined method and the assets can be distributed with the one or more digital IDs to the one or more recipients. In one example, if the property is monetary, the funds could be disbursed using a peer-to-peer (P2P) method implemented as an electronic funds transfer as an alternative to paying with a traditional payment method such as a check or money order.

A peer-to-peer system can include various methods of sending money between individuals and may be an alias-based system. An alias-based system can distribute funds to an account without the recipient having to disclose personal financial information. For example, the system can facilitate peer-to-peer payments by entering the recipient's name, email, or phone number and selecting the account for which to transfer the funds. The recipient's name, email, or phone number can be linked to an account with a routing number. The system identifies the recipient's name, email, or phone number with the particular account and transfers the money into the account associated with the recipient. In another example, the system can involve funding prepaid accounts and then using the prefunded value to distribute funds to other accounts held on behalf of the recipient. In another example, a book transfer can be used to transfer funds. Other examples of peer-to-peer transfers known in the art are also contemplated.

Although the particular examples discussed herein relate to the transfer of assets to recipients to estates, wills, and trusts, and the like, the exemplary embodiments discussed herein can also be applied to other counterparties sending and receiving money such as consumers, businesses, non-profit organizations, and other entities. Additionally, the example embodiments discussed herein could also be applied to payments to businesses.

A tracking of the funds feature could also be provided with the system. In this way all of the disbursement information could be kept current and accurate. For example, the administrators of wills, trusts, and estates could be provided with the ability to track all of the disbursements and confirmation of the funds received by the beneficiary. In this example, the system could be configured to display the property and amount of property conveyed to the one or more recipients for tracking purposes. The tracking of funds feature could be implemented in conjunction with the payment methods such as a peer-to-peer distribution of funds, and the peer-to-peer system could store the transactions to track the distributions of the funds.

In other examples, the system could be used in conjunction with insurance policies, IRAs, 401Ks, and other like conveyance vehicles that may have certain distribution schedules. For example, these accounts or policies may name spouses and/or children as the beneficiaries. In certain instances, a spouse or child may be an executor of a policy or account and may not be aware of the policy or account. The system could benefit these individuals by providing notifications regarding the accounts and policies once the system is provided with a digital ID of the recipient. Additionally, the system may help recipients by delivering relevant information regarding a conveyance vehicle. The recipients can use this information to best take advantage of assets that are a part of the conveyance vehicle and for management, financial planning, and the like.

Other system uses include providing the holding documents relating to the conveyance vehicle to the recipients or other relevant individuals. The system will maintain updated contact information for these individuals, and the system may be implemented to distribute these documents directly to these individuals and to contact these individuals regarding such documents.

In addition to the examples discussed above, the system could be implemented in a variety of forms to distribute funds to recipients. For example, life insurance firms could use the system to distribute funds to the recipients named on life insurance policies. The system could also be used by donors to distribute money to charities or in memory of a person. The system could allow people to use an online network to register and transfer the funds. Additionally an executor, estate owner, or grantor could set up a gift disbursement or distribution schedule using the system. Moreover, the system could be implemented to disburse funds up to the IRS limit and track the amount of funds being disbursed for tax planning purposes.

In another example, the system described herein could be used in conjunction with long term health care insurance. Typically individuals with long term care insurance receive a predetermined benefit or $X a day for services. In some cases, the individual or family is responsible to pay the care community directly and seek reimbursement from the policy holder. The system could be implemented to distribute the payments to the individuals or family members directly. In this example, the system could provide peer-to-peer type payments through a digital ID or an alias to the individual so the individual can pay the particular health care providers directly or be reimbursed.

The system could also be provided with graphic user interfaces and may provide various views for the user to obtain information regarding the assets being held. These views could be provided to grantors and recipients and may include recipient information such as a listing of the recipients, digital IDs, addresses, and other relevant information. The views may also include the last time the list was updated for administrative purposes to help the administrators and/or recipients determine whether all information is current. The views may also include a firm or corporate logo, or the like to identify the administrator of the particular conveyance vehicle. In one exemplary embodiment, revenue could be generated for the party maintaining the system by charging an annual fee for using the service or charging a fee for each fund distribution.

In one exemplary aspect an apparatus comprising: a processor; and a memory for storing computer readable instructions that, when executed by said processor, cause the computer to perform a method of maintaining beneficiary information. The method may include obtaining information for one or more recipients of one or more conveyances of property, obtaining one or more digital IDs from the one or more recipients; maintaining the one or more digital IDs from the one or more recipients by periodically sending notifications to the one or more recipients, and distributing assets with the one or more digital IDs to the one or more recipients. The digital IDs may include email addresses or mobile phone numbers. The one or more recipients can be periodically notified to determine whether the one or more digital IDs have been altered.

The method may further include sending a notification to the one or more recipients requesting that the one or more recipients confirm that the digital ID is accurate. The method may further include receiving at least one updated digital ID from the one or more recipients. The method may further include displaying the one or more digital IDs for the distribution of property. The one or more recipients can be beneficiaries of a will, estate, or trust. The method may further include sending a request for an updated digital ID to the one or more recipients and receiving updated digital IDs from the one or more recipients. The method may further include sending a distribution notification to the one or more recipients using the one or more digital IDs and displaying the property and amount of property conveyed to the one or more recipients.

The present invention is disclosed above and in the accompanying drawings with reference to a variety of embodiments. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims.

We claim:

1. An apparatus comprising:
   a processor; and
   a memory for storing computer readable instructions that, when executed by said processor, cause a computer to:
   identify one or more conveyance vehicles, the one or more conveyance vehicles including at least one of: a will, a trust, and an estate;
   receive information for one or more recipients of one or more conveyances of property identified in the one or more conveyance vehicles;
   receive a digital identifier (ID) from the one or more recipients;
   on a periodic basis, transmit a notification to the one or more recipients via the digital ID requesting confirmation of accuracy of the digital ID;
   and
   distribute assets associated with the conveyance of property to the one or more recipients via a peer-to-peer transaction made using the digital ID, the digital ID being linked to an account of the one or more recipients.

2. The apparatus of claim 1 wherein the digital ID comprises at least one of: an email address or a mobile phone number.

3. The apparatus of claim 1 wherein the one or more recipients are periodically notified to determine whether the digital ID has been altered.

4. The apparatus of claim 1 further comprising receiving at least one updated digital ID from the one or more recipients.

5. The apparatus of claim 1 further comprising displaying the digital ID for the distribution of property.

6. The apparatus of claim 1 wherein the one or more recipients are beneficiaries of the will, estate, or trust.

7. The apparatus of claim 1 further comprising transmitting a request for an updated digital ID to the one or more recipients and receiving an updated digital ID from the one or more recipients.

8. The apparatus of claim 1 further comprising transmitting a distribution notification to the one or more recipients using the digital ID.

9. The apparatus of claim 1 further comprising displaying the property and amount of property conveyed to the one or more recipients.

10. A method of maintaining beneficiary information, comprising:
    identifying one or more conveyance vehicles, the one or more conveyance vehicles including at least one of: a will, a trust, and an estate;
    receiving information for one or more recipients of one or more conveyances of property identified in the one or more conveyance vehicles;
    receive a digital identifier (ID) from the one or more recipients;
    on a periodic basis, transmit a notification to the one or more recipients via the digital ID requesting confirmation of accuracy of the digital ID;
    and
    distributing assets associated with the conveyance of property to the one or more recipients via a peer-to-peer transaction made using the digital ID, the digital ID being linked to an account of the one or more recipients.

11. The method of claim 10 wherein the digital ID comprises at least one of: an email address or a mobile phone numbers.

12. The method of claim 10 wherein the one or more recipients are periodically notified to determine whether the digital ID has been altered.

13. The method of claim 12 further comprising transmitting a request for an updated digital ID to the one or more recipients and receiving an updated digital ID from the one or more recipients.

14. The method of claim 10 further comprising receiving at least one updated digital ID from the one or more recipients.

15. The method of claim 10 further comprising displaying the digital ID for the distribution of property.

16. The method of claim 10 wherein the one or more recipients are beneficiaries of the will, estate, or trust.

17. The method of claim 10 further comprising transmitting a distribution notification to the one or more recipients using the digital ID.

18. The method of claim 10 further comprising displaying the property and amount of property conveyed to the one or more recipients.

\* \* \* \* \*